United States Patent
Nishida

(10) Patent No.: US 9,667,371 B2
(45) Date of Patent: May 30, 2017

(54) TRANSMISSION APPARATUS AND TRANSMISSION METHOD

(71) Applicant: FUJITSU LIMITED, Kawasaki-shi, Kanagawa (JP)

(72) Inventor: Hiroshi Nishida, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 105 days.

(21) Appl. No.: 14/695,359

(22) Filed: Apr. 24, 2015

(65) Prior Publication Data

US 2015/0365741 A1 Dec. 17, 2015

(30) Foreign Application Priority Data

Jun. 12, 2014 (JP) .................. 2014-121781

(51) Int. Cl.
*H04J 3/16* (2006.01)
*H04J 3/14* (2006.01)
(52) U.S. Cl.
CPC .............. *H04J 3/1652* (2013.01); *H04J 3/14* (2013.01)
(58) Field of Classification Search
None
See application file for complete search history.

(56) References Cited

U.S. PATENT DOCUMENTS

| | | | | |
|---|---|---|---|---|
| 2003/0170020 A1* | 9/2003 | Chaudhuri | ........... | H04B 10/032 398/5 |
| 2005/0185954 A1* | 8/2005 | Sadananda | ........... | H04B 10/032 398/5 |
| 2006/0274782 A1* | 12/2006 | Rikitake | ................... | H04J 3/14 370/465 |
| 2007/0242605 A1* | 10/2007 | Lei | ........................... | H04L 45/00 370/228 |
| 2007/0292129 A1* | 12/2007 | Yan | ...................... | H04B 10/032 398/5 |
| 2008/0152340 A1* | 6/2008 | Hung | .................... | H04J 3/1694 398/2 |
| 2009/0028561 A1* | 1/2009 | Zhang | ....................... | H04J 3/14 398/45 |
| 2009/0303996 A1* | 12/2009 | Takase | ................ | H04L 12/1868 370/390 |

(Continued)

OTHER PUBLICATIONS

International Telecommunication Union, "Interfaces for the optical transport network", ITU-T G.709/Y.1331 (Feb. 2012), Telecommunication Standardization Sector of ITU, 238 pp.

(Continued)

*Primary Examiner* — Gary Mui
(74) *Attorney, Agent, or Firm* — Staas & Halsey LLP

(57) ABSTRACT

A transmission apparatus includes: a first input-output unit; a second input-output unit; a third input-output unit located in a first direction that is a transmission direction from the first input output unit and the second input-output unit; and a switch coupled to the first input-output unit, the second input-output unit, and the third input-output unit, wherein the first input-output unit requests the third input-output unit via the switch to notify in a second direction opposite to the first direction of a defect upon detecting the defect, wherein the third input-output unit transmits defect information indicating the defect to one of the first input-output unit and the second input-output unit via the switch in response to a requesting from the first input-output unit.

12 Claims, 9 Drawing Sheets

(56) References Cited

U.S. PATENT DOCUMENTS

| | | | | |
|---|---|---|---|---|
| 2013/0121685 A1* | 5/2013 | Rao | H04J 14/0212 | |
| | | | 398/17 | |
| 2013/0170838 A1* | 7/2013 | Tsuchiya | H04J 3/1652 | |
| | | | 398/98 | |
| 2014/0072295 A1* | 3/2014 | Wakaki | H04B 10/038 | |
| | | | 398/5 | |
| 2014/0258772 A1* | 9/2014 | Kataria | H04B 3/50 | |
| | | | 714/4.11 | |
| 2016/0056887 A1* | 2/2016 | Shimizu | H04J 3/14 | |
| | | | 398/5 | |

OTHER PUBLICATIONS

International Telecommunication Union, "Types and characteristics of optical transport network equipment", ITU-T G.798.1 (Jan. 2013), Telecommunication Standardization Sector of ITU, 54 pp.

International Telecommunication Union, "Optical Transport Network (OTN): Linear protection", ITU-T G.873.1 (Jul. 2011), Telecommunication Standardization Sector of ITU, 30 pp.

* cited by examiner

TRANSMISSION APPARATUS AND TRANSMISSION METHOD

CROSS-REFERENCE TO RELATED APPLICATION

This application is based upon and claims the benefit of priority of the prior Japanese Patent Application No. 2014-121781, filed on Jun. 12, 2014, the entire contents of which are incorporated herein by reference.

FIELD

The embodiments discussed herein are related to a transmission apparatus and a transmission method.

BACKGROUND

The optical transport network (OTN), standardized by the International Telecommunication Union Telecommunication Standardization Sector (ITU-T), is used in long distance large capacity network.

An optical transport unit (OTU) signal as a main signal of OTN has a nest structure of layer. In the nest structure, an OTUk layer is arranged on the outermost side, followed by an ODUk-tandem connection monitoring (TCM) layer, and an ODUk-path monitoring (PM) as described in ITU-T G.709. In a channelized structure, the outermost layer is followed by an ODUj-TCM layer and ODUj-PM layer.

A redundancy structure is incorporated in OTN in case of a defect in an apparatus or a transmission path (a disconnection of an optical fiber). The incorporation of redundancy is standardized as subnetwork connection (SNC) protection in Standard ITU-T G. 873.1 (July 2011).

FIG. 5 and FIG. 6 illustrate OTN. FIG. 5 is Figure II-3 in ITU-T G.798.1 (January 2013). A functional model is illustrated in the left-hand portion of FIG. 5, and an implementation model is illustrated in the right-hand portion of FIG. 5. FIG. 6 is Figure II-4 in ITU-T G.798.1 (January 2013). A functional model is illustrated in the left-hand portion of FIG. 6, and an implementation model is illustrated in the right-hand portion of FIG. 6.

In the SNC protection, HO ODUk SNC/S in FIG. 5 and HO ODUk SNC/I in FIG. 6 are configured so that a lower layer having the redundancy structure is switched if a defect is detected in the termination of the higher layer of the nest structure.

Related technique is disclosed in ITU-T G.798 (January 2013) Appendix II.

SUMMARY

According to an aspect of the embodiments, a transmission apparatus includes: a first input-output unit; a second input-output unit; a third input-output unit located in a first direction that is a transmission direction from the first input output unit and the second input-output unit; and a switch coupled to the first input-output unit, the second input-output unit, and the third input-output unit, wherein the first input-output unit requests the third input-output unit via the switch to notify in a second direction opposite to the first direction of a defect upon detecting the defect, wherein the third input-output unit transmits defect information indicating the defect to one of the first input-output unit and the second input-output unit via the switch in response to a requesting from the first input-output unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

A transmission apparatus of the OTN includes a plurality of input-output port unit configured to be connected to another apparatus to transmit and receive an OTN signal (optical signal) (hereinafter also referred to as an input-output unit), and a switch unit configured to perform a cross-connection process or a redundancy process (protection process) on the OTN signal. In the transmission apparatus, the input-output units and the switch unit are coupled via physical wire on a back board (back wired board (BWB)), for example, an electronic signal.

The OTN includes a process referred to as an alarm transfer. If a defect is detected in a transmission path at a given layer, an alarm indication signal (AIS) and a bit interleaved parity (BIP) are transmitted in the alarm transfer using overhead information to an input-output unit in a forward direction at that layer. A backward defect indication (BDI)/backward error indication (BEI) are transmitted using overhead information to an input-output unit in a backward direction.

Figure 6:
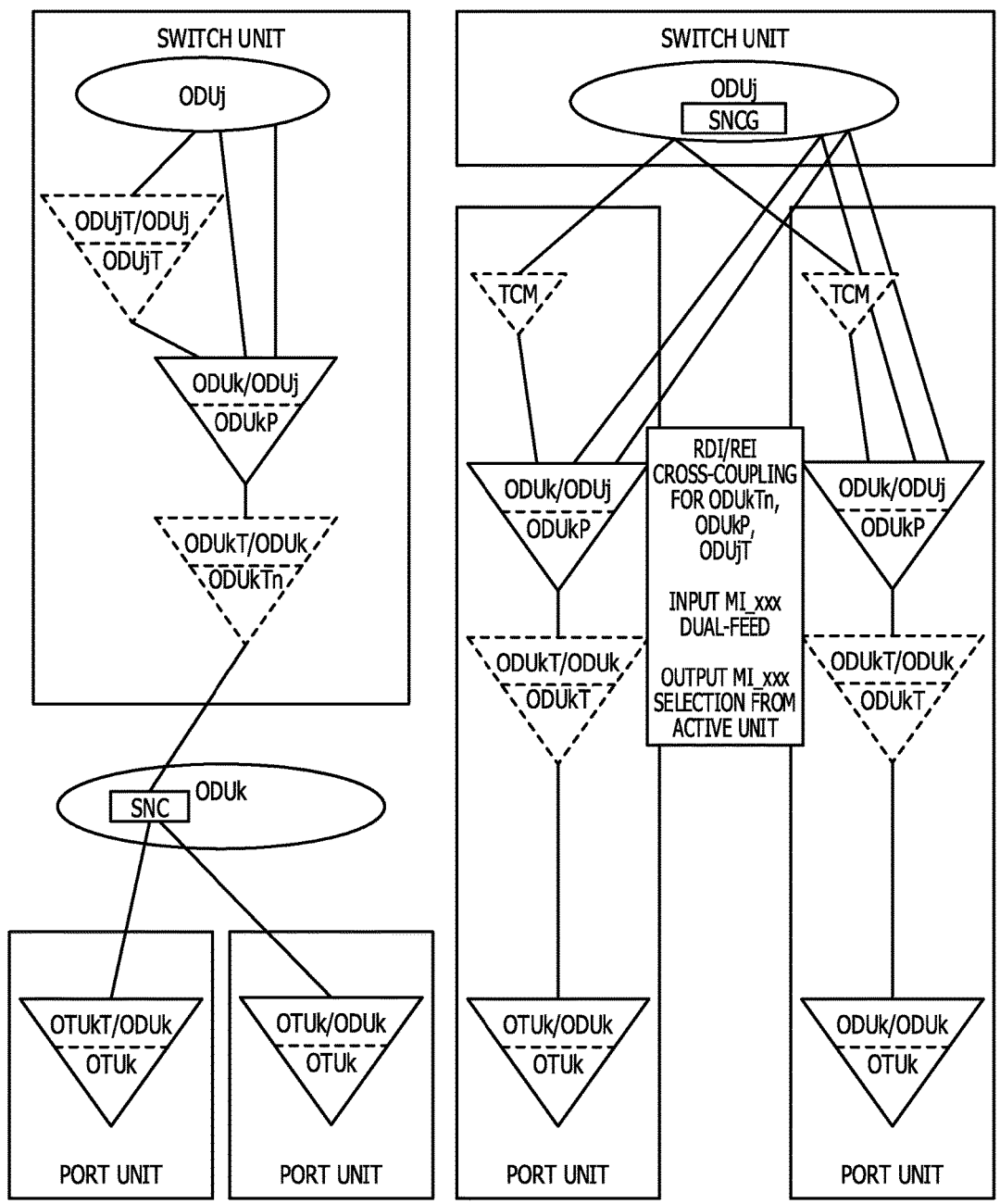
FIG. 6 illustrates an example of an OTN.

Referring to the left-hand portion of FIG. 6, an optical channel transport unit (OTUk) is terminated at triangles on the bottom side of the left-hand portion with respect to a line coming from a lower layer. At the termination, SNC protections are switched at an optical channel data unit (ODUk) level in response to network defect information serving as a trigger. An ODUk-tandem connection monitoring (TCM) layer is terminated at the ODUkT triangle. If a network defect causing TCM-BDI is detected at this termination, ODUk TCM-BDI is transmitted in the backward direction. An ODUk-path monitoring (PM) layer is terminated, and if a network defect causing ODUk-BDI is detected at this termination, ODUk-BDI is transmitted in the backward direction. An ODUj TCM layer is terminated at an ODUjT triangle, and if a network defect causing ODUj TCM-BDI is detected at this termination, ODUj TCM-BDI is transmitted in the backward direction. A remaining ODUj signal is cross-connected by a switch unit in an oval shape at the top of the left-hand portion.

For example, the implementation model is illustrated in the right-hand side of FIG. 6. The ODUk SNC protection and the ODUj cross-connect function are performed by the switch unit. All the layers of OTUk, ODUk-TCM, ODUk- PM, and ODUj-TCM are terminated at input-output units at both sides of the redundancy structure (ACT (act, actually-used) side, STBY (standby, backup) side).

Since the ODUk-TCM, ODUk-PM, and ODUj-TCM layers are functionally (logically) selected by the SNC protection as illustrated in the left-hand side of FIG. 6, only the act side is present. In the implementation apparatus, the act side and the standby side are present as illustrated in the right-hand side of FIG. 6. For this reason, the ODUk-TCM, ODUk-PM, and ODUj-TCM layers are terminated at the act side and the standby side, and the BDI alarm transfer is performed at each of the terminations.

BDI based on the network defect causes at one of the ODUk-TCM, ODUk-PM, and ODUj-TCM layers in the forward direction of the act side is transmitted (transferred) in the backward direction of both the act side and the standby side. In the implementation model, however, the transfer may be performed in the backward direction on each of the act side and the standby side. For this reason, a case in which the AIS alarm is output in the forward direction in unidirectional line protection and the BDI alarm is not output in the backward direction, and an inconsistency case which is opposite to the case may occur.

Figure 7:
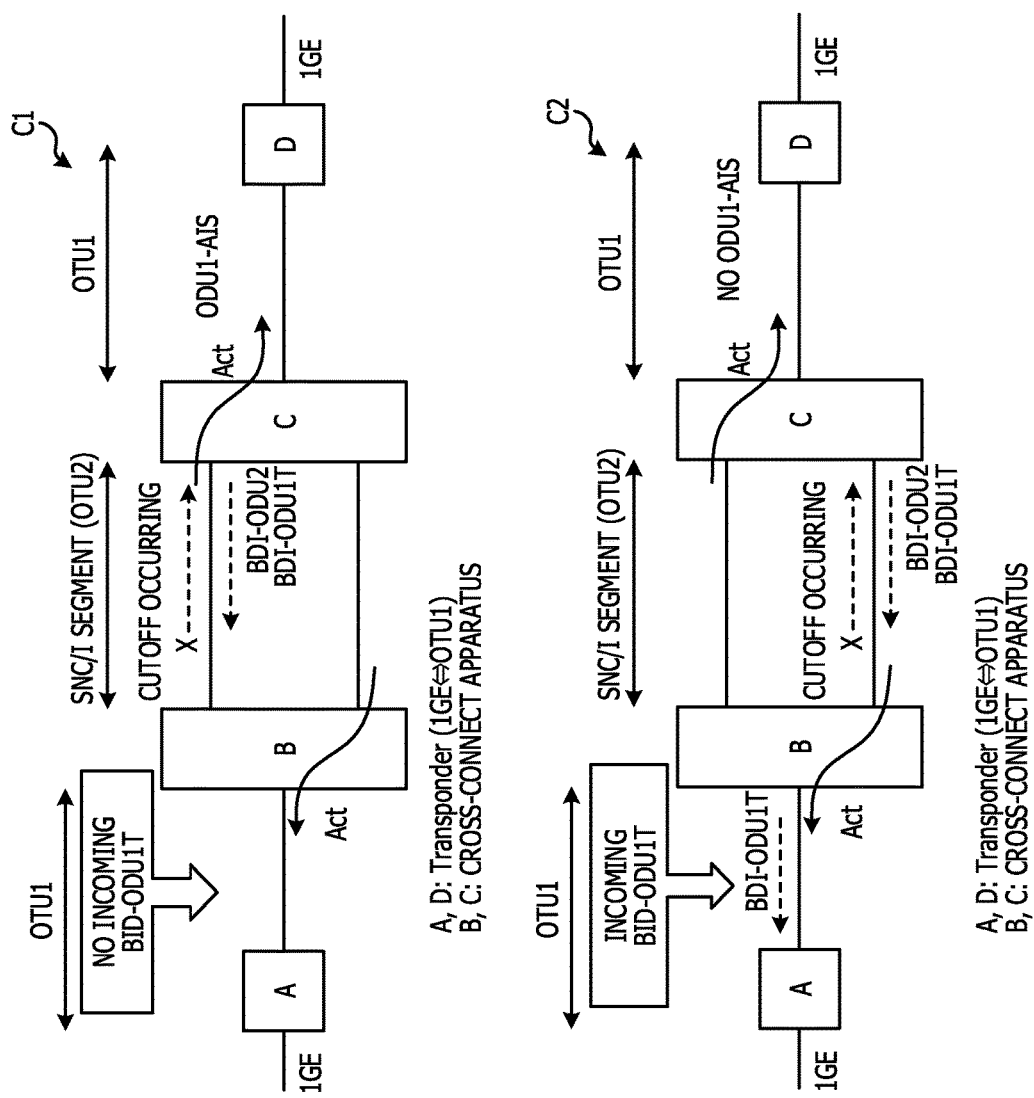
FIG. 7 illustrates an example of BDI transmission during an occurrence of a defect.

FIG. 7 illustrates an example of BDI transmission during an occurrence of a defect. Referring to FIG. 7, letters "A" and "D" represent transponders that convert from 1 GE (giga bit Ethernet (registered trademark)) to OTU0 or conversely convert from OTU0 to 1 GE. Letters "B" and "C" represent cross-connect apparatuses that connect SNC/I segments (OTU2). Referring to FIG. 7, in case C1, an ODU-AIS alarm is output in the forward direction from the apparatus C to the apparatus D, but BDI-ODU1T is not output in the backward direction from the transponder B to the transponder A, in response to the occurrence of a cutoff (network defect) in the SNC/I segment (OTU2). Conversely, in case C2, the ODU1-AIS is not output in the forward direction, but BDI-ODU1T is output in the backward direction, in response to the occurrence of a cutoff (network defect) in the SNC/I segment (OTU2).

To reduce the inconsistency cases C1 and case C2, the two input-output units are coupled via physical wires to exchange BDI/BEI (hereinafter BEI is occasionally omitted) information.

Figure 8:
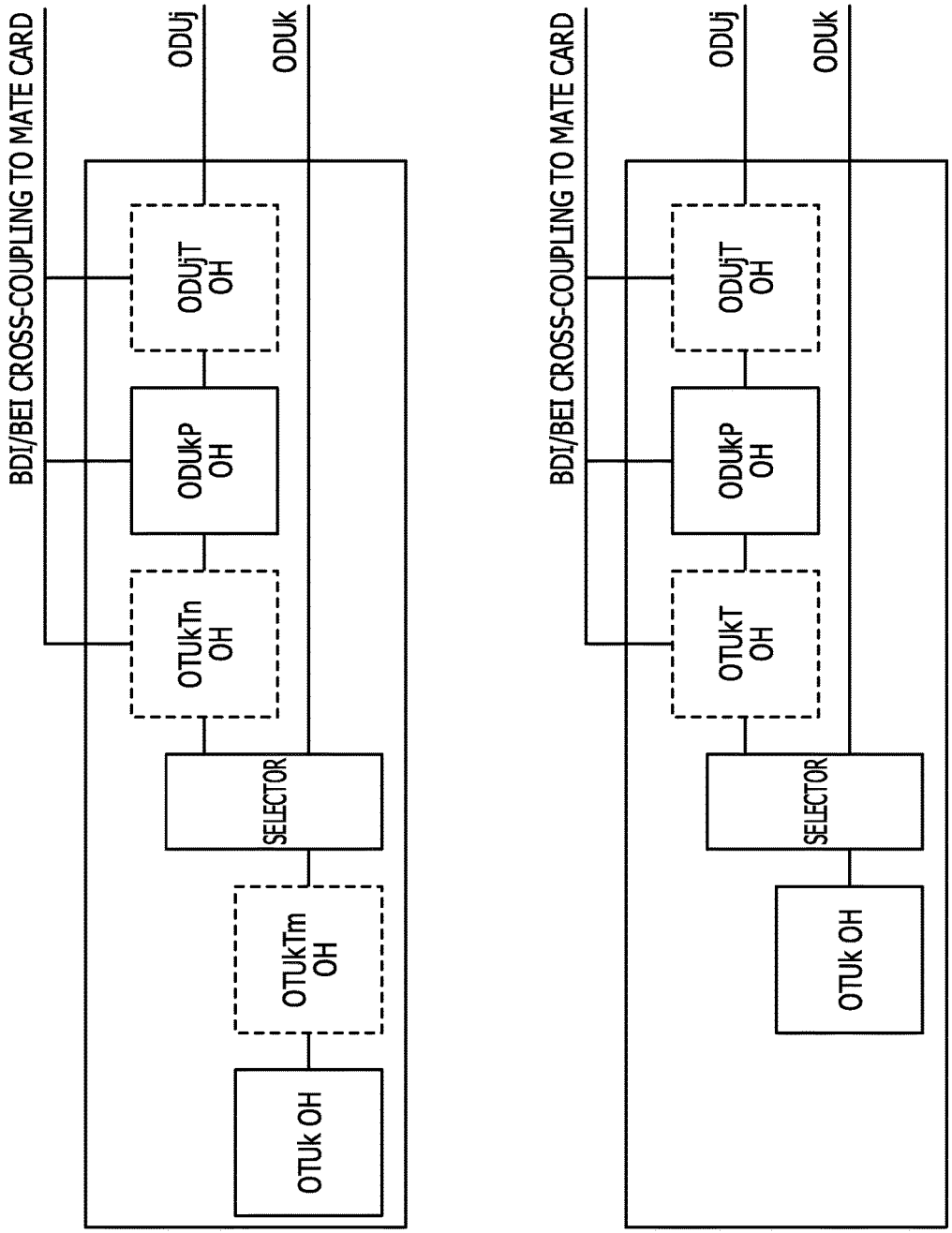
FIG. 8 illustrates an example of an input-output port unit.
Figure 9:
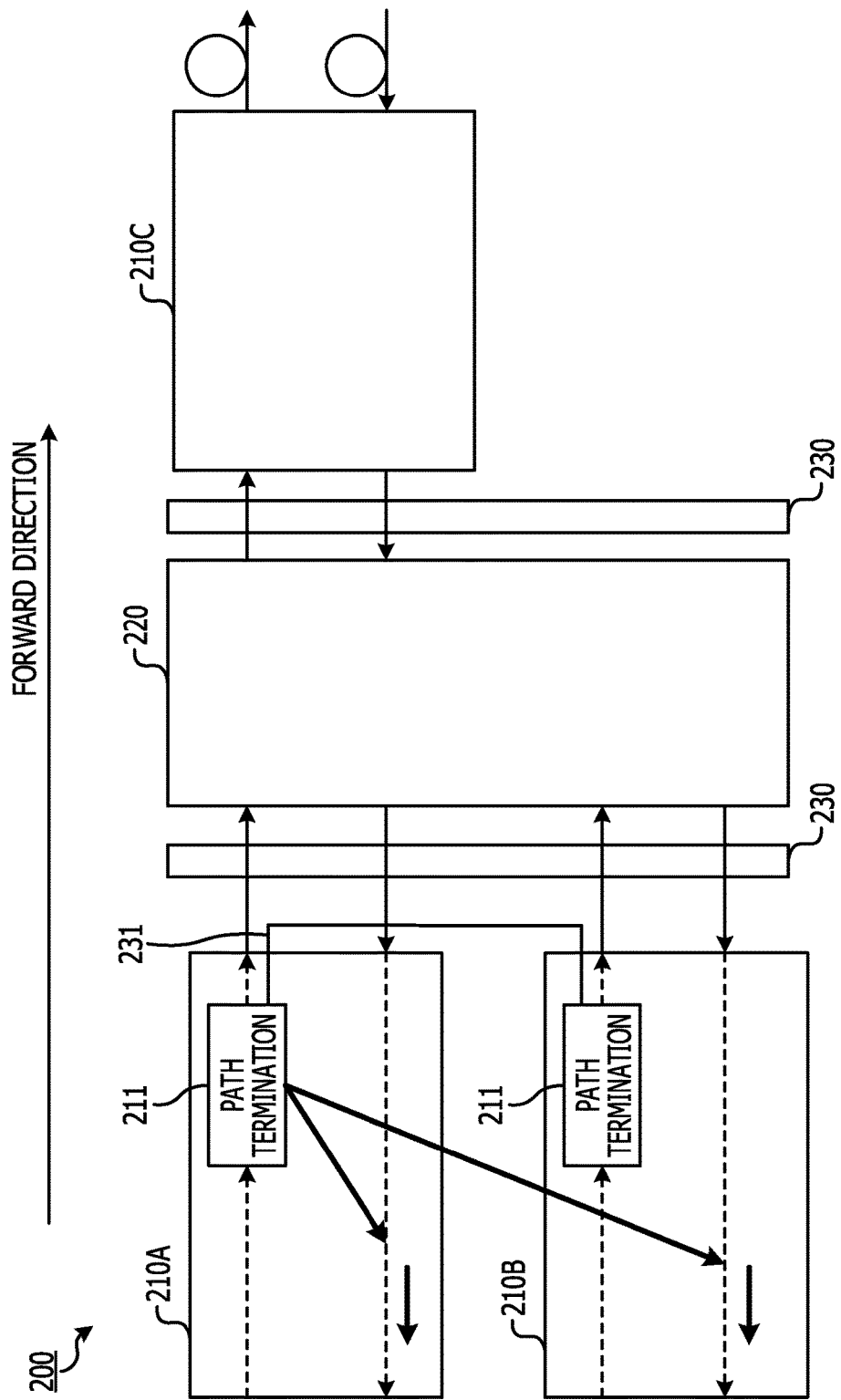
FIG. 9 illustrates an example of a transmission apparatus.

FIG. 8 illustrates an example of input-output port units. Two input-output port units at the top portion and the bottom portion are physically coupled as illustrated in FIG. 8. FIG. 9 illustrates an example of a transmission apparatus.

As illustrated in FIG. 8, two adjacent input-output units having protection are coupled via physical wires (BDI/BEI cross-coupling to mate card). As illustrated in FIG. 9, for example, a transmission apparatus 200 includes input-output units 210A, 210B and 210C coupled to each other via back boards 230, and a switch unit 220. Path terminations 211 of the two adjacent input-output units 210A and 210B are coupled to each other via a physical wire 231. The two adjacent input-output units 210A and 210B exchange the BDI/BEI information detected at the ODUk-TCM, ODUk-PM, and ODUj-TCM layers via the physical wire 231.

A new physical wire is arranged between any input-output units arranged on the back board in order to exchange the BDI/BEI information between the input-output units. For example, if line protection is performed in any combination of input-output units other than the two adjacent input-output units, a physical wire is arranged to couple those input-output units. For this reason, exchanging the BDI/BEI information between any input-output units to share the BDI/BEI information may be difficult. A back board having no pre-arranged physical wire to couple input-output units is replaced with a back board having a new physical wire, and such a replacement operation may be time consuming.

Elements having the same or similar functions in the present embodiment are designated with the same reference numerals and the discussion thereof may be omitted or reduced.

Figure 1:
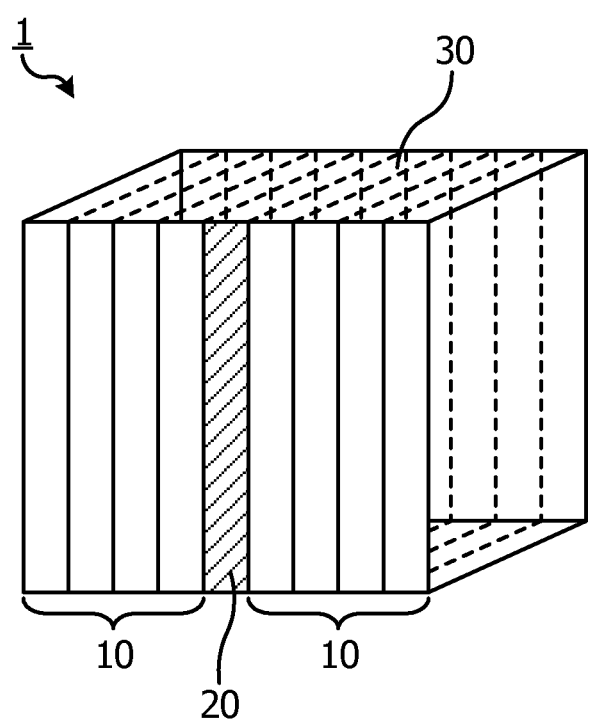
FIG. 1 illustrates an example of a transmission apparatus.

FIG. 1 illustrates a transmission apparatus. Referring to FIG. 1, the transmission apparatus 1 may be a shelf-type apparatus that includes a back board 30 having a plurality of slots that receive input-output units 10, and a switch unit 20. The input-output units 10 and the switch unit 20 loaded onto the back board 30 are coupled to each other via a cable (physical wires) on the back board 30.

The input-output unit 10 may be an interface unit having a plurality of ports. Each port is coupled to a transmission line, such as an optical fiber cable or Ethernet (registered trademark) cable, included in a network. The input-output unit 10 transmits and receives a signal via the transmission path coupled to each port. In view of a defect in apparatuses and the transmission path, for example, a cutoff of the optical fiber, the input-output unit 10 may include an act unit that is normally used and a standby unit that is switchably used during the defect.

The switch unit 20 performs a cross-connect process to sort signals received by each of the ports of the input-output unit 10 to each of the ports serving as destinations of the signals, respectively. If a defect takes place in the act input-output unit 10, the switch unit 20 performs a protection process to switch to the standby input-output unit 10.

In the shelf-type transmission apparatus 1, the input-output unit 10 or the switch unit 20 loaded in the slots of the back board 30 is reconfigured according to desired performance and function so that a configuration appropriate for intended service may be flexibly set up.

Figure 2:
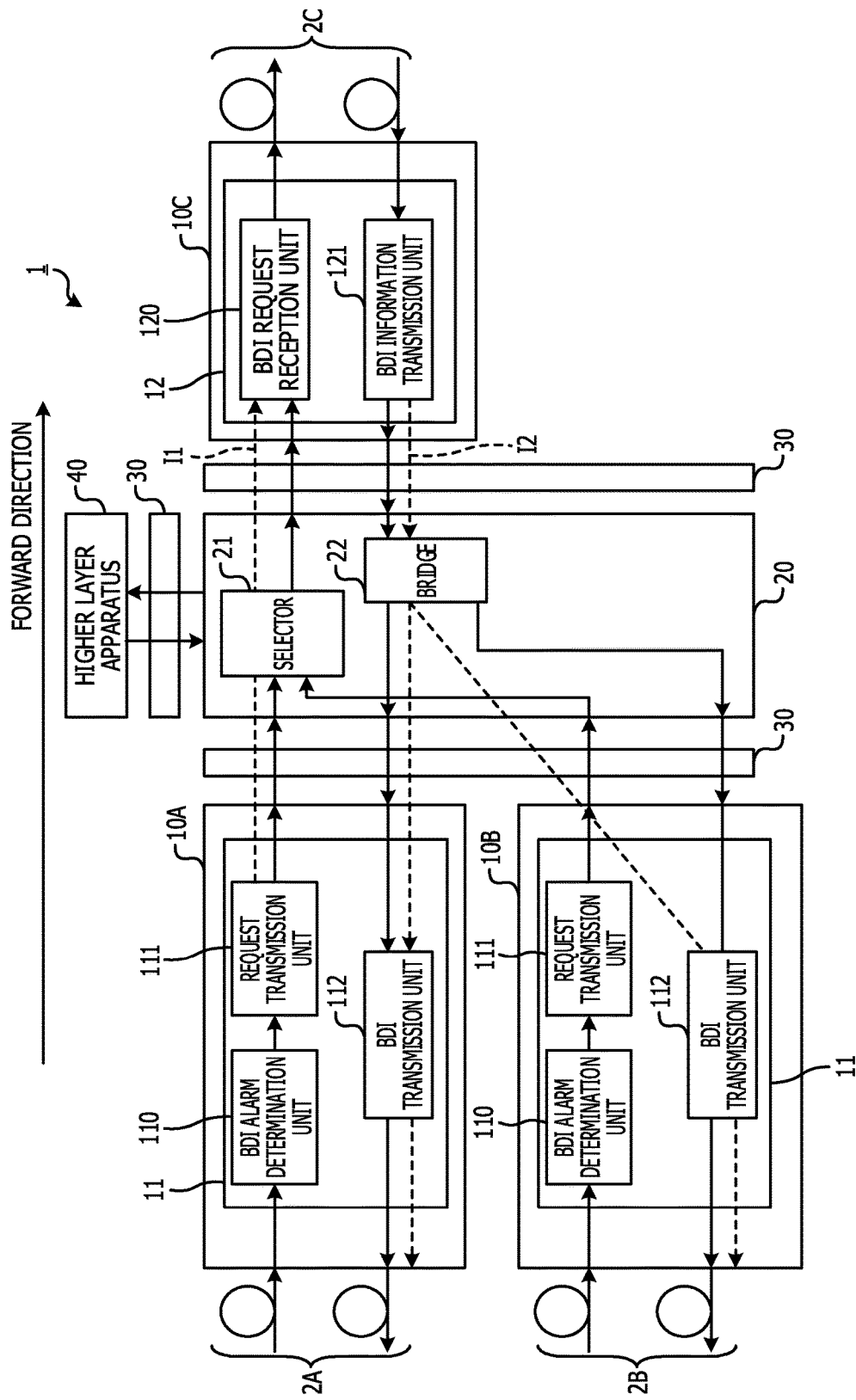
FIG. 2 illustrates an example of a transmission apparatus.

FIG. 2 illustrates an example of a transmission apparatus. In FIG. 2, a functional configuration of the transmission apparatus 1 is illustrated. In FIG. 2, regarding a transmission direction of a network via transmission paths 2A, 2B, and 2C, the right direction is set to the forward direction with respect to the transmission direction. The left direction is set to the backward direction with respect to the transmission direction.

As illustrated in FIG. 2, the switch unit 20 is coupled to input-output units 10A, 10B, and 10C and a higher layer apparatus 40 via the back boards 30. The higher layer apparatus 40 may be a micro control unit (MCU), and controls the cross-connect process and the protection process of the switch unit 20.

The input-output units 10A, 10B, and 10C are respectively coupled to transmission paths 2A, 2B, and 2C. The redundancy structure may be employed in which one of the input-output units 10A and 10B is set to the act unit and the other of the input-output units 10A and 10B is set to the standby unit. For example, the input-output unit 10A may be set to the act unit and the input-output unit 10B may be set to the standby unit. The input-output unit 10C is a unit placed in the forward direction of the paths routed through the input-output units 10A and 10B.

Each of the input-output units 10A and 10B includes an alarm transfer unit 11 that transfers an alarm when a defect is detected in one of the paths 2A and 2B. The alarm transfer unit 11 may include a hardware circuit or a processor that executes a software program.

The alarm transfer unit 11 includes a BDI alarm determination unit 110, a request transmission unit 111, and a BDI transmission unit 112. The BDI alarm determination unit 110 detects an alarm (alert) causing the BDI transmission in response to a signal input via the transmission path. The BDI alarm determination unit 110 outputs detection results to the request transmission unit 111.

If an alarm causing the BDI transmission is detected, the request transmission unit 111 notifies, to the input-output unit 10C in the forward direction, a BDI transmission request I1 requesting the BDI transmission responsive to the detected alarm, using the switch unit 20. For example, the request transmission unit 111 may make a notification with including the BDI transmission request I1 in an overhead of the OTU signal as a main signal that is transmitted via the switch unit 20.

The BDI transmission request I1 may be notified using a reserve region reserved for expansion use in the overhead of the OTU signal. The BDI transmission request I1 may be notified using a BDI/BEI region of each layer in the forward direction of the overhead of the OTU signal. BDI/BEI in the forward direction is terminated at the input-output unit 10A on the input side. Therefore, there is no regulation standard concerning the BDI/BEI region in the forward direction at each layer of the overhead of the OTU signal in a way from the input-output unit 10A to the input-output unit 10C via the switch unit 20. For this reason, the BDI transmission request I1 may be notified using the BDI/BEI region.

If a defect is detected in the transmission path 2A, the alarm transfer unit 11 in the input-output unit 10A, by using the BDI alarm determination unit 110 and the request transmission unit 111, requests the input-output unit 10C, via the switch unit 20, to transmit BDI for notifying of the defect in the backward direction. The BDI transmission unit 112 transmits BDI in the backward direction of the transmission direction in response to BDI information I2 that the input-output unit 10C has transmitted via the switch unit 20.

The input-output unit 10C includes an alarm transfer unit 12. In response to the BDI transmission request I1 from the input-output unit 10A, the alarm transfer unit 12 performs a transfer process to transfer the BDI information I2 to the input-output units 10A and 10B. The alarm transfer unit 12 may include a hardware circuit or a processor that executes a software program.

The alarm transfer unit 12 includes a BDI request reception unit 120 and a BDI information transmission unit 121. The BDI request reception unit 120 receives the BDI transmission request I1 in the OTU signal that the input-output unit 10A has transmitted via the switch unit 20. The BDI request reception unit 120 notifies the BDI information transmission unit 121 of the received BDI transmission request I1, and terminates the transmission of the BDI transmission request I1 in the forward direction.

In response to the notification of the BDI transmission request I1, the BDI information transmission unit 121 transmits the BDI information I2 in the backward direction to transmit BDI. For example, the BDI information transmission unit 121 includes the BDI information I2 in the overhead of the OTU signal that is a main signal to be transmitted via the switch unit 20, and then transmits the OTU signal. A bridge 22 in the switch unit 20 transmits the OTU signal to the input-output units 10A and 10B, each having a redundancy structure.

In the same way as the BDI transmission request I1, the BDI information I2 may be notified using a reserve region reserved to be used for expansion use in the overhead of the OTU signal. The BDI information I2 may be notified using the BDI/BEI region of each layer in the backward direction of the overhead of the OTU signal.

The switch unit 20 includes a selector 21 and bridge 22. The selector 21, controlled by the higher layer apparatus 40, selects between a signal from the input-output unit 10A as an act system and a signal from the input-output unit 10B as a backup system, and then transmits the selected signal to the input-output unit 10C. For example, if a defect occurs in the act system, the selector 21 selects the signal from the input-output unit 10B as the backup system and then transmits the selected signal to the input-output unit 10C. The bridge 22, controlled by the higher layer apparatus 40, transmits a signal from the input-output unit 10C to the input-output units 10A and 10B, each having the redundancy structure.

Figure 3:
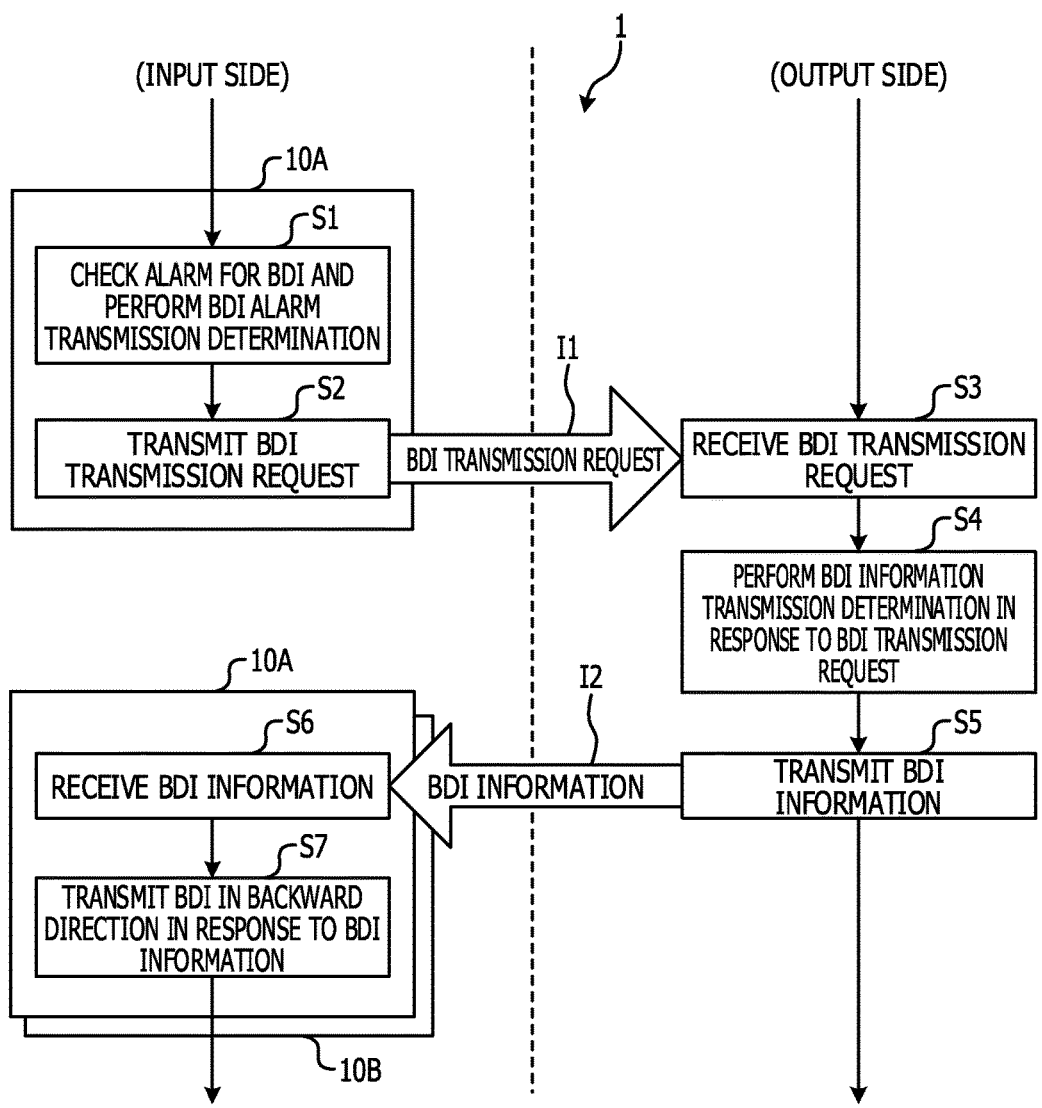
FIG. 3 illustrates an example of an operation of a transmission apparatus.

FIG. 3 illustrates an example of an operation of a transmission apparatus. The transmission apparatus illustrated in FIG. 1 and FIG. 2 may operate as illustrated in FIG. 3. In the input-output unit 10A at the input side as illustrated in FIG. 3, the BDI alarm determination unit 110 checks an alarm of the cause of the BDI transmission based on a signal input via the transmission path 2A, and performs a transmission determination of the BDI alarm (S1). If an alarm is triggered, the request transmission unit 111 includes the BDI transmission request I1 requesting the BDI transmission responsive to the alarm into the overhead of the OTU signal and notifies the input-output unit 10C in the forward direction (output side) of the OTU signal (S2).

Figure 4:
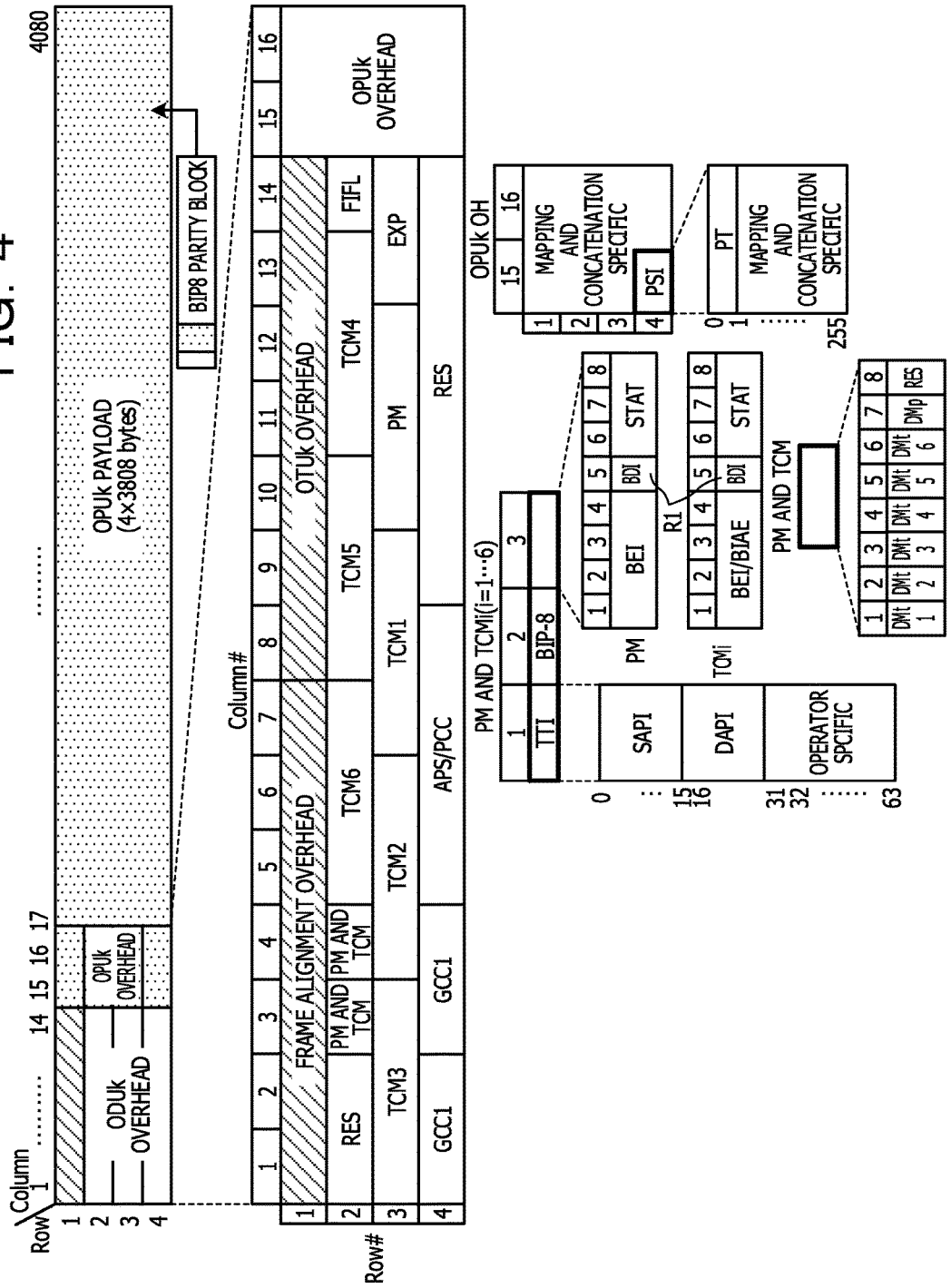
FIG. 4 illustrates an example of an OTN frame.
Figure 5:
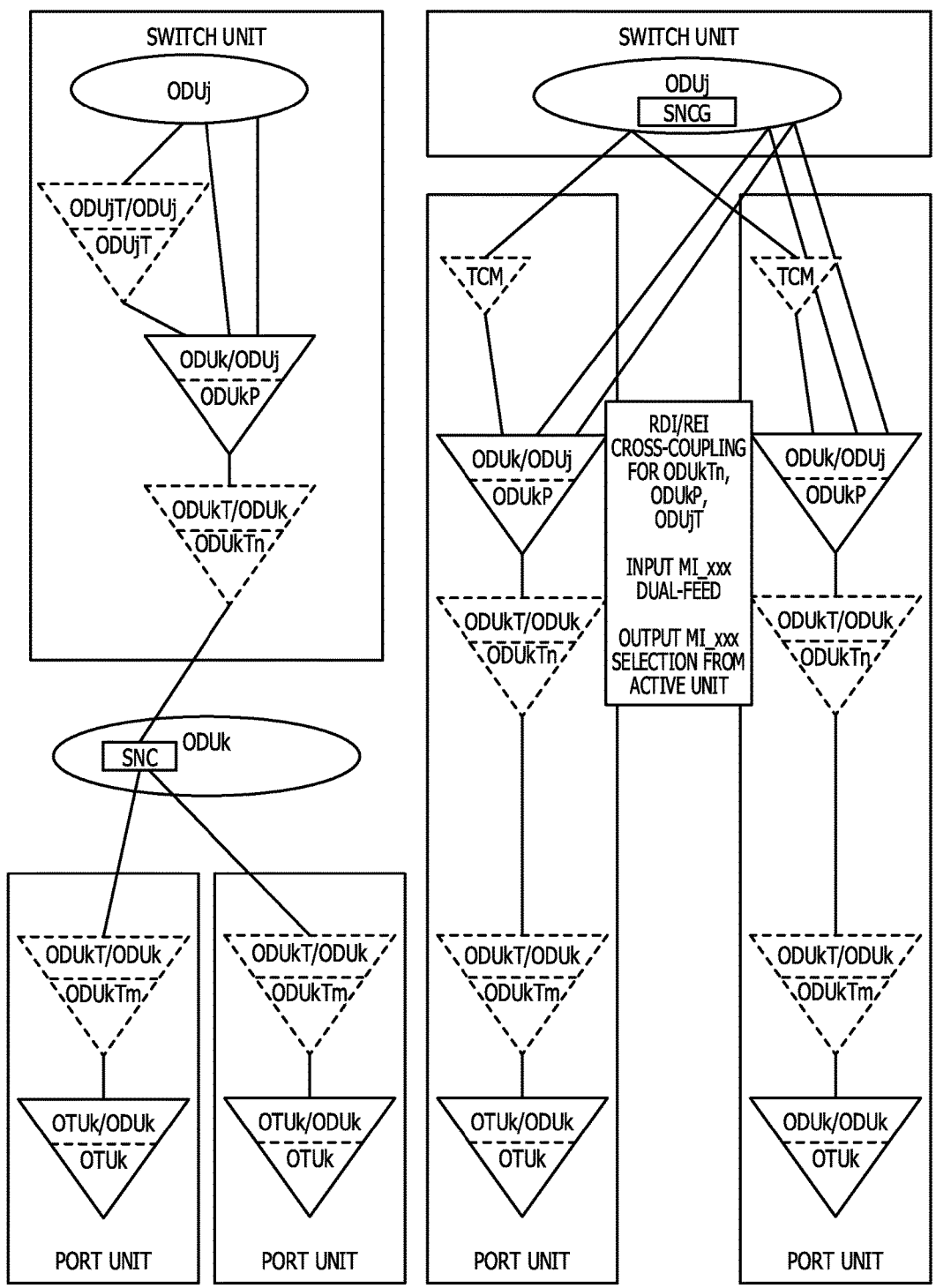
FIG. 5 illustrates an example of an OTN.

FIG. 4 illustrates an example of an OTN frame. As illustrated in FIG. 4, the BDI transmission request I1 may be included in a BDI/BEI region R1 of the ODUk overhead terminated at the input-output unit 10A and the BDI transmission request I1 may be notified in S2. In this way, the BDI transmission request I1 is notified after being included in the OTU signal that is transmitted via the switch unit 20. The BDI transmission request I1 may thus be notified without modifying the configuration of the transmission apparatus.

The BDI request reception unit 120 in the input-output unit 10C at the output side receives the BDI transmission request I1 (S3). The BDI information transmission unit 121 verifies the reception of the BDI transmission request I1 and then performs a transmission determination of the BDI information I2 (S4). If the BDI transmission request I1 has been received from the input-output unit 10A, the BDI information transmission unit 121 includes the BDI information I2 in the overhead of the OTU signal and then transmits the OTU signal to the input-output units 10A and 10B in the backward direction (input side) (S5).

Referring to FIG. 4, the BDI information I2 may be included in the BDI/BEI region R1 of the ODUk overhead and then the OTU signal may be transmitted in S5. In this way, the BDI information I2 is included in the OTU signal that is to be transmitted via the switch unit 20. Therefore, the BDI transmission request I1 may be transmitted without modifying the configuration of the transmission apparatus.

In each of the input-output units 10A and 10B at the input side, the BDI transmission unit 112 receives the BDI information I2 (S6). If the BDI information I2 has been received, the BDI transmission unit 112 transmits BDI in the backward direction of the transmission direction (to the transmission paths 2A and 2B of the input-output units 10A and 10B).

Upon detecting a defect in the transmission path 2A, the input-output unit 10A in the transmission apparatus 1 notifies the input-output unit 10C of the BDI transmission request I1 via the switch unit 20. In response to the notification of the BDI transmission request I1 from the input-output unit 10A, the input-output unit 10C transmits to the input-output units 10A and 10B the BDI information I2 responsive to the defect in the input-output unit 10A via the switch unit 20. The input-output unit 10A and the input-output unit 10C thus easily share the BDI/BEI information without arranging a new physical wire on the switch unit 20.

If a new physical wire is arranged on the switch unit 20 to share the BDI/BEI information, power consumption may increase because of an increase of the new physical wire. 5 bits per path may be used in BDI/BEI. Seven layers of 6 TCM+PM are used per ODU. 80 TS (tributary slots) are used in ODU0 in OTU4 (100 G). If the frame period of ODU0 is 1.168 μs, for example, transmission speed is 5 bits×7 layers×80 TS/1.168 μs=2.4 Gbps so that the transmission speed becomes fast.

The alarm transfer is performed in the backward direction of ODUx PM, TCM at the termination, but the transmission speed is different at ODUx. Arbitration may be performed if physical wires are used for connection. For example, if no physical wires are used, the BDI/BEI information may be easily shared.

The input-output unit 10A may be an act system, and the input-output unit 10B may be a standby system. Alternatively, the input-output unit 10B may be an act system, and the input-output unit 10A may be a standby system. In such a case, the request transmission unit 111 in the input-output unit 10B transmits the BDI transmission request I1 to the input-output unit 10C.

The BDI information transmission unit 121 may transmit the BDI information I2 to only the input-output unit 10B as the standby system. Since the input-output unit 10A itself as the act system detects a defect, the BDI/BEI information is shared and then BDI is transmitted without receiving the BDI information I2 from the input-output unit 10C.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A transmission apparatus comprising:
    a first input-output unit;
    a second input-output unit;
    a third input-output unit located in a first direction that is a transmission direction from the first input output unit and the second input-output unit; and
    a switch coupled to the first input-output unit, the second input-output unit, and the third input-output unit,
    wherein the first input-output unit requests the third input-output unit via the switch to notify in a second direction opposite to the first direction of a defect upon detecting the defect;
    wherein the third input-output unit transmits defect information indicating the defect to one of the first input-output unit and the second input-output unit via the switch in response to the requesting from the first input-output unit; and
    wherein the switch comprises:
        a selector configured to select an output of the first input-output unit or an output of the second input-output unit and to supply a selected output to the third input-output unit; and
        a bridge configured to transmit the defect information to one of the first input-output unit and the second input-output unit.

2. The transmission apparatus according to claim 1, wherein the first input-output unit requests the third input-output unit using a first signal to be transmitted via the switch, a overhead region of the first signal including a notification of the defect.

3. The transmission apparatus according to claim 2, wherein the first signal is an optical transport unit signal.

4. The transmission apparatus according to claim 1, wherein the third input-output unit transmits to one of the first input-output unit and the second input-output unit a second signal to be transmitted via the switch with the defect information contained in an overhead region.

5. The transmission apparatus according to claim 4, wherein one of the first input-output unit and the second input-output unit transmits a backward defect indication (BDI) in the second direction in accordance with the defect information contained in the overhead region of the second signal.

6. The transmission apparatus according to claim 4, wherein the second signal is an optical transport unit signal.

7. The transmission apparatus according to claim 1, wherein the first input-output unit is an act unit, and wherein the second input-output unit is a standby unit.

8. A transmission method comprising:
    receiving a signal by a first input-output unit and a second input-output unit;
    detecting a defect in the first input-output unit;
    requesting, via a switch, a third input-output unit to make a notification of the defect, the third input-output unit provided at a more forward position in a transmission direction of the signal than positions of the first input-output unit and the second input-output unit; and
    transmitting, by the third input-output unit transmits, via the switch, defect information indicating the defect to one of the first input-output unit and the second input-output unit in a direction opposite to the transmission direction,
    wherein the switch comprises:
        a selector configured to select an output of the first input-output unit or an output of the second input-output unit and to supply a selected output to the third input-output unit; and
        a bridge configured to transmit the defect information i to one of the first input-output unit and the second input-output unit.

9. The transmission method according to claim 8, further comprising:
    including a notification of the defect in a overhead region of the first signal.

10. The transmission method according to claim 8, wherein the first input-output unit is an act unit and the second input-output unit is a standby unit.

11. The transmission method according to claim 8, wherein the first signal is an optical transport unit signal.

12. The transmission method according to claim 8, wherein the second signal is an optical transport unit signal.

* * * * *